United States Patent [19]

Khutoretsky et al.

[11] 4,184,091
[45] Jan. 15, 1980

[54] OPPOSITELY DIRECTED SLOTTING WEDGES FOR RETAINING THE WINDING OF AN ELECTRIC MACHINE STATOR

[76] Inventors: Garry M. Khutoretsky, Altaiskaya ulitsa, 20, kv. 5; Alexandr I. Vorontsov, Pushkin, ulitsa Khazova, 43, kv. 94; Anatoly D. Ignatiev, ulitsa Basseinaya, 85, kv. 162, all of Leningrad, U.S.S.R.

[21] Appl. No.: 755,033

[22] Filed: Dec. 28, 1976

[51] Int. Cl.² .............................................. H02K 3/48
[52] U.S. Cl. ..................................... 310/214; 310/271
[58] Field of Search ............... 310/214, 215, 194, 254, 310/271

[56] References Cited

U.S. PATENT DOCUMENTS

| | | | |
|---|---|---|---|
| 1,320,126 | 10/1919 | Dudley | 310/214 |
| 1,375,699 | 4/1921 | Ilg | 310/214 |
| 1,396,525 | 11/1921 | Pieper | 310/214 |
| 2,569,278 | 9/1951 | Barth | 310/214 |
| 2,723,358 | 11/1955 | Holmgren | 310/214 |
| 3,139,550 | 6/1964 | Geer | 310/214 |
| 3,740,601 | 6/1973 | Amasino | 310/214 |
| 3,778,891 | 12/1973 | Amasino | 310/214 |
| 4,015,156 | 3/1977 | Johrde | 310/214 |

FOREIGN PATENT DOCUMENTS

| | | | |
|---|---|---|---|
| 591672 | 2/1960 | Canada | 310/214 |
| 657423 | 3/1938 | Fed. Rep. of Germany | 310/214 |
| 761181 | 3/1954 | Fed. Rep. of Germany | 310/271 |
| 28811 | 1/1971 | U.S.S.R. | 310/214 |

*Primary Examiner*—R. Skudy
*Attorney, Agent, or Firm*—Lackenbach, Lilling & Siegel

[57] ABSTRACT

An electric machine stator comprises a core with slots for placing winding bars therein. The winding bars are locked within the slots by pairs of oppositely directed wedges. To eliminate the possibility of an axial displacement of the wedges and, as a result, a looseness of wedging the winding bars, the peripheral portions of extreme wedges adjoining the winding bars protrude outside the stator core and have cross slots with a band located therein which also surround the stator winding bars.

2 Claims, 4 Drawing Figures

OPPOSITELY DIRECTED SLOTTING WEDGES FOR RETAINING THE WINDING OF AN ELECTRIC MACHINE STATOR

The present invention relates to the art of electromechanical engineering, and, more particularly, to stators of electric machines. The invention can most advantageously be used in heavy electric machines, such as turbo-generators.

It is common knowledge that any electric machine comprises the fixed part called a stator and the rotating part called a rotor. Various electric machine stator constructions are known in the prior art. A common stator of a high-power electric machine comprises a frame with a core located therein, the core having longitudinal slots. Insulated bars constituting a winding are disposed in these core slots.

The winding bars are held in place within the slots by wedges placed on the top of these bars to eliminate the possibility of their movement in a radial or axial direction.

Furthermore, the winding bars may be provided with strips made from a material having the ability to be shaped, impregnated with hot-setting composition to ensure that the winding bars are more firmly retained in the slots. These strips are usually placed on the narrow faces of the bars. After the wedges are installed within the slots, the slot portion of the winding is baked to provide that the winding bars be monolithically retained within the slots.

However, as is apparent to those skilled in the art, during operation of a high-power electric machine having large current density within the slot winding, large electrodynamic forces occurring in the stator winding cause the winding vibration.

After an electric machine has been in service for some time, the fit tightness of the slot wedges may be considerably reduced through the effect of electric and mechanical forces, aging of both securing members and insulation of the winding, or due to other reasons. During operation of an electric machine, the winding bars within the core slots begin to experience periodic radial vibrations and even resonate on certain frequencies resulting in severe erosive damage of the bar insulation due to numerous discharges caused by interruptions of the capacitive current as the bars are moved. These effects cause cracking of the conductor elements of the bars, mechanical abrasion of the insulation with its consequent breakdown, and, finally, acoustic noise generation. Moveover, the slot wedge, due to a certain looseness of the fit, may freely move within the longitudinal slot of the core even to the extent of coming out of the slot, again resulting in severe damage of the winding and other parts of the electric machine. These faults are so significant that they appreciably reduce both efficiency and life of an electric machine, requiring more frequent repairs. Taking into account high-power electric machines (800,000 KW-1,200,000 KW), it should be readily apparent that large economic benefits can be obtained as a result of increasing period between repairs of an electric machine.

In some prior art embodiments, the slot portions of the winding are retained by the wedges of uniform cross section along the whole length thereof. Such wedges fail to ensure sufficient taking-up of radial clearances between the winding bar and the slot due to the modern process of manufacturing both winding bars and slots which fails to ensure invariable size along the whole length thereof. Because of this, sealing strips of varying thickness are inserted between the wedge and the bar.

Both manufacturing and positioning of such wedges are easy enough, but it is difficult to provide, using such wedges, the desired pressure on both winding bar and slot inner surface ruling out the possibility of wedge movement in the radial and axial directions.

After an electric machine has been in operation for some time, if a need arises to tighten the wedges, the latter have to be removed from the slot and a new thicker sealing strip has to be inserted after which the wedges are reinserted. Consequently, the setting up time during assembly and maintenance of an electric machine tends to increase. Locking such a wedge is ensured exclusively by frictional forces which are no doubt reduced in the course of time mainly as a result of vibrations.

It has been also known to retain the slot portions of the winding by oppositely directed wedges, the wedges having inclined surfaces. When wedging the winding, the wedges are placed so that the inclined surface of one wedge is forced against the mating inclined surface of the other wedge and moved axially within the slots. The inclined surface of one wedge slides over the mating inclined surface of the other wedge, exerting thereby radial pressure on the winding bars.

Retaining the wedges, once inserted, against movement in an axial direction can be ensured by cuts made in the form of slanting slits on the side portions of the wedges, the cuts providing for a tight engagement with the side walls of the slot. Retaining the wedges by the slits on the side portions thereof, however, is not sufficiently reliable in the sense that, on the one hand, the engagement between the wedges side surfaces and the slot walls provided by these slits is not tight enough and, on the other hand, these slits are apt to wear off during wedging and operation of an electric machine.

Theoretically the winding bars within each slot can be wedged by two pairs of oppositely directed wedges, one pair from each end. However, it is practically impossible to wedge the bars in such a manner taking into account that the core slot of a heavy electric machine is too long (from 6 to 8 m) and the wedge has a small height in its maximum cross section (about 20 mm). In practice, several pairs of the oppositely directed wedges are brought in each end of the slot in succession, their end faces of the wedges tightly adjoining each other. It is apparent to those skilled in the art that it is enough to retain the pairs of the extreme wedges to prevent the fit looseness of the others.

Accordingly, an object of the present invention is to provide means for retaining the stator winding bars within the core slots to prevent their axial displacement during operation of an electric machine.

Another object of the present invention is to provide a stator resistant to vibrations occurring during operation of an electric machine.

Still another object of the present invention is to encrease the reliability and longevity of a high-power electric machine having the stator with the winding constituted by the bars.

These and other objects are attained in a stator of an electric machine, comprising a core with slots for placing wherein a winding constituted by bars retained by oppositely directed wedges, in accordance with the invention, the peripheral portions of the extreme wedges adjoining the winding bars protruding outside the stator core, said protruding portions having cross slots with a band located therein and surrounding the stator winding bar.

The proposed construction of the stator prevents an axial displacement of the wedges within the slots and thereby minimizing release of preasure on the winding due to oppositely directed wedges and contributes to a higher reliability of an electric machine.

Other and further objects and advantages of the invention will be better understood from the following description of a specific embodiment thereof, taken in conjunction with the accompanying drawings, wherein.

Figure 1:
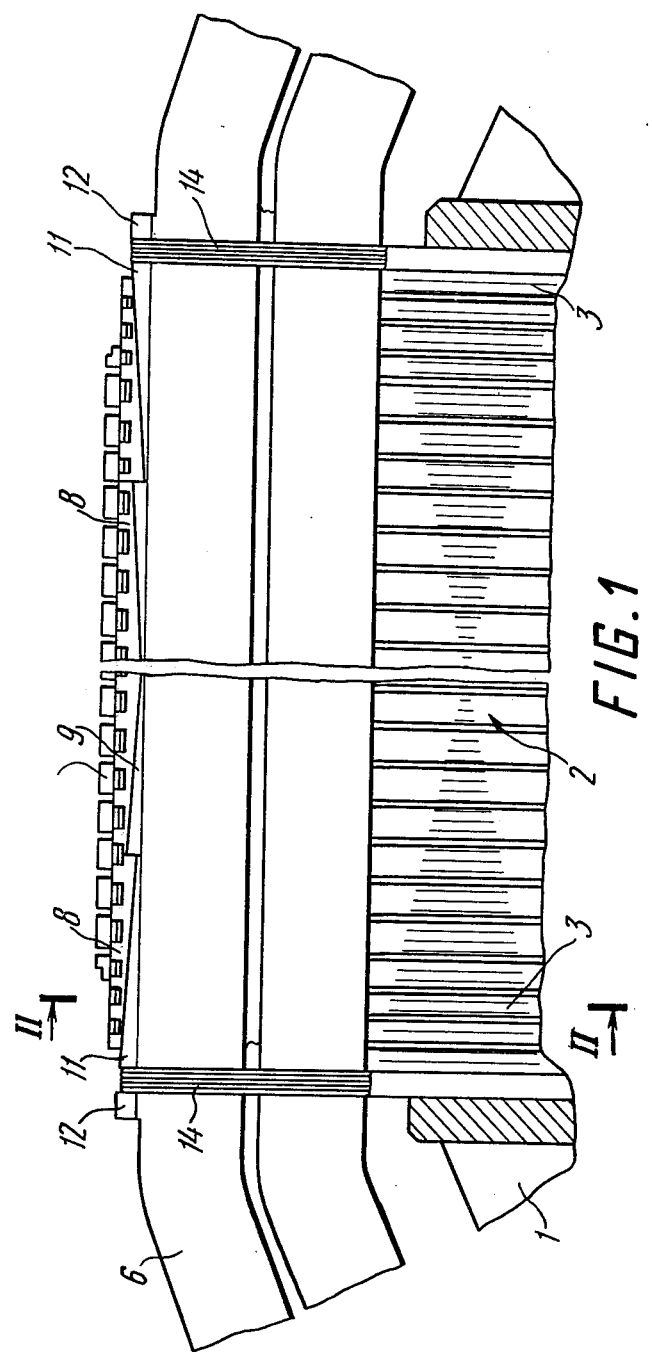
FIG. 1 is a cross-sectional view of an electric machine stator with winding bars retained in the core slots by wedges, in accordance with the present invention.
Figure 2:
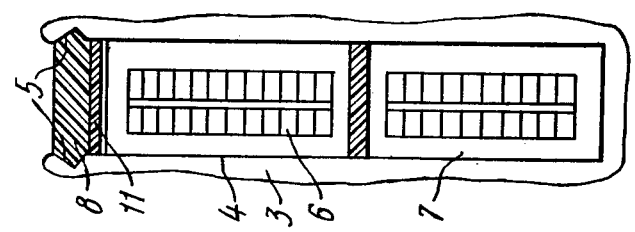
FIG. 2 is a cross-sectional view taken along line II—II of FIG. 1.
Figure 3:
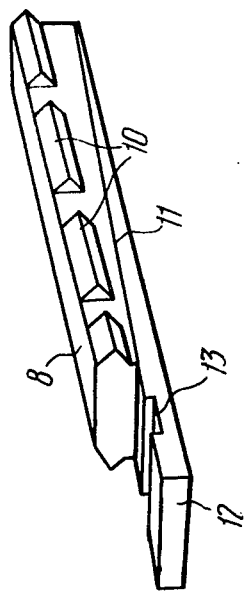
FIG. 3 shows two extreme oppositely directed slot wedges, in accordance with the invention.

Referring now to FIGS. 1 and 2, a stator 1 comprises a core 2 made up of stacked laminations 3 shaped so as to define upon assembly of the core 2, a number of circumferentially arranged radial slots 4, rectangular in cross section, said slots extending longitudinally along the core 2. Grooves 5 having a dovetail configuration are disposed near the top of the slot 4 (FIG. 2). Winding bars 6 surrounded by a strong layer of insulation 7 are placed within the slots 4. Oppositely directed wedges 8 and 9 lock the winding bars 6 in the slots 4. The side walls of the wedge 8 (FIG. 3) have protrusions 10 shaped like the grooves 5 located near the top of the slots 4 (FIG. 2). The inclined surfaces of the wedges 8 face the winding bars 6. The wedges 9 are located between the wedges 8 and the bars 6 so that the inclined surfaces of the wedges 9 face and are in contact with the mating inclined surfaces of the wedges 8 (FIG. 1). Peripheral portions 12 of extreme wedges 11 adjoining the winding bars 6 protrude outside the core 2 (FIG. 1), said protruding portions 12 having cross slots 13 (FIGS. 3,4) with a band 14 located therein and surrounding also the core winding bars 6 of the electric machine stator 1 (FIG. 1).

When assembling the stator 1, the winding bars 6 are placed in the slots 4 of the core 2 (FIGS. 1 and 2). The oppositely directed wedges 8 and 9 are used to lock the bars 6 within the slots 4. The wedge 8 therewith is placed into the top of the slot 4 so that the side protrusions 10 (FIG. 3) of the wedge 8 are locked in grooves 5 of the slot 4, dovetail connection is thereby formed (FIG. 2). The inclined surface of the wedge 8 faces the winding bars 6. Such retaining of the wedge 8 prevents its radial displacement but fails to ensure that the wedge 8 be locked reliably in the axial direction. The wedge 9 is placed between the wedge 8 and the bars 6 so that the inclined surface of the wedge 9 slides over the mating inclined surface of the wedge 8, following which the bars 6 are wedged within the slot 4.

Figure 4:
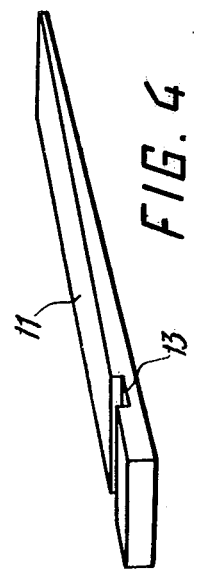
FIG. 4 shows an extreme slot wedge with a cross slot, in accordance with the invention.

The radial pressure exerted by the wedges 8 and 9 on the bars 6 reliably retains the bars within the slot 4. The pairs of wedges 8 and 9 are placed so as to adjoin the adjacent pairs of the wedges at their face ends. In an effort to prevent the axial displacement of the wedges and, as a result, the decrease of the radial pressure on the winding bars 6, the extreme wedges 11 are secured to the bars 6 by the band 14 (FIG. 1), said band being placed into the cross slots 13 of the extreme portion 12 of the wedge 11 (FIGS. 1, 4). The band 14 placed within the slot 13 of the extreme wedge 11 also surrounds the winding bar 6. It is advantageous to make up the band 14 of a self-shrinkable cord impregnated by hot-setting adhesive.

The present invention provides means for considerably reducing preventive maintenance time of an electric machine. If the oppositely directed wedges are not secured, the locking of the winding bars within the slot becomes weaker in time of operation of an electric machine, that results in the grave distortions of electric machine operating characteristics. For rewedging the winding bars, it is necessary that the rotor be disengaged from the stator.

The present invention makes it possible to fully prevent the looseness of both fit of the slot wedges and locking the winding bars within the slots. The preventive maintenance of an electric machine requiring the disengagement a rotor from a stator takes as a rule about three weeks as a common preventive maintenance requires one week. It should be readily apparent that an electric machine idle time during two weeks causes a great economic damage to the electric machine owner.

It will be understood that this invention is not limited by the details of the embodiment herein described and shown, but other modifications of the invention can be made which will remain within the concept and scope thereof.

What is claimed is:

1. In an electric machine stator comprising a core with longitudinal slots for placing therein a winding constituted by bars retained by oppositely directed wedges, the improvement comprising in that peripheral portions of extreme oppositely directed wedges adjoining the winding bars protrude outside the stator core and have cross slots, and a band located in said cross slots which surrounds the stator winding bars.

2. In an electric machine stator as defined in claim 1, wherein said oppositely directed wedges include upper and lower wedges, and said cross slots are formed in said lower wedges.

* * * * *